(12) United States Patent
Skillsäter et al.

(10) Patent No.: US 11,797,015 B2
(45) Date of Patent: Oct. 24, 2023

(54) METHOD AND SYSTEM FOR DETERMINING A TARGET VEHICLE SPEED OF A VEHICLE OPERATING AT A WORKSITE

(71) Applicant: VOLVO CONSTRUCTION EQUIPMENT AB, Eskilstuna (SE)

(72) Inventors: Calle Skillsäter, Torshälla (SE); Andreas Norrman, Arboga (SE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 305 days.

(21) Appl. No.: 17/041,948

(22) PCT Filed: Apr. 4, 2018

(86) PCT No.: PCT/EP2018/025090
§ 371 (c)(1),
(2) Date: Sep. 25, 2020

(87) PCT Pub. No.: WO2019/192667
PCT Pub. Date: Oct. 10, 2019

(65) Prior Publication Data
US 2021/0080963 A1    Mar. 18, 2021

(51) Int. Cl.
*G05D 1/02* (2020.01)
*B60W 40/105* (2012.01)

(52) U.S. Cl.
CPC ......... *G05D 1/0217* (2013.01); *B60W 40/105* (2013.01); *G05D 1/0223* (2013.01); *G05D 2201/0202* (2013.01)

(58) Field of Classification Search
CPC ............... G05D 1/0217; G05D 1/0223; G05D 2201/0202; G05D 1/0291; B60W 40/105
See application file for complete search history.

(56) References Cited

U.S. PATENT DOCUMENTS 9,256,227 B1    2/2016   Wei et al.
9,500,490 B1    11/2016  Scott
(Continued)

FOREIGN PATENT DOCUMENTS

JP           2004-145386 A      5/2004
WO      WO 2013/165298 A1     11/2013

OTHER PUBLICATIONS

International Search Report and Written Opinion of the International Searching Authority, PCT/EP2018/025090, dated Dec. 12, 2018, 15pages.

*Primary Examiner* — Jeff A Burke
*Assistant Examiner* — Sihar A Karwan
(74) *Attorney, Agent, or Firm* — Sage Patent Group

(57) ABSTRACT

The invention relates to a system and a method for determining a target vehicle speed for a vehicle moving between a starting location and a target location at a worksite. The method comprising: determining a first expected time-of arrival at the target location for a first vehicle; determining a second expected time-of arrival at the target location for a second vehicle, wherein the second expected time-of arrival is later than the first expected time-of arrival; determining a first time difference as the difference between the first expected time-of-arrival and the second expected time-of-arrival; estimating a fuel consumption for the first vehicle for reaching the target location at a current vehicle speed; estimating if the fuel consumption of the first vehicle for reaching the target location can be reduced by reducing the vehicle speed; and if the fuel consumption can be reduced, reducing the speed of the first vehicle to a target vehicle speed, wherein the target vehicle speed is higher than a threshold speed determined based on the first time difference.

14 Claims, 5 Drawing Sheets

(56) References Cited

U.S. PATENT DOCUMENTS

| | | |
|---|---|---|
| 2014/0297182 A1 | 10/2014 | Casson et al. |
| 2015/0198445 A1 | 7/2015 | Casson et al. |
| 2016/0239023 A1* | 8/2016 | Rylander ............... G01C 21/34 |
| 2017/0336239 A1 | 11/2017 | Collins |
| 2019/0129440 A1* | 5/2019 | Borhan ................ G05D 1/0223 |
| 2021/0080963 A1* | 3/2021 | Skillsäter ............. G05D 1/0223 |
| 2022/0147012 A1* | 5/2022 | Skillsäter ............. G05D 1/0291 |

* cited by examiner

METHOD AND SYSTEM FOR DETERMINING A TARGET VEHICLE SPEED OF A VEHICLE OPERATING AT A WORKSITE

CROSS REFERENCE TO RELATED APPLICATIONS

This application is a 35 U.S.C. § 371 national stage application of PCT International Application No. PCT/EP2018/025090 filed on Apr. 4, 2020, the disclosure and content of which is incorporated by reference herein in its entirety.

TECHNICAL FIELD

The present invention relates to a system and method for controlling a vehicle to reach a target destination for the vehicle. The invention is applicable on vehicles, for example working machines within the fields of industrial construction machines and in particular articulated haulers. Although the invention will be described with respect to an articulated hauler, the invention is not restricted to this particular machine, but may also be used in other construction equipment or in other vehicles, such as wheel loaders, trucks, etc.

BACKGROUND

In connection with transportation of e.g. loads at construction site or the like, working machines in the form of articulated haulers, wheel loaders, trucks or dumpers are frequently used. In its simplest configuration, the machines are arranged to load a platform of the vehicle, or a container or the like arranged on the platform of the vehicle, at a loading position of the construction site and drive to an unloading position of the construction site, located at a distance from the loading position, where it unloads the platform of the vehicle. At the unloading position, the loads are often taken care of in one way or the other. For example, at a quarry plant, large stone material is often freighted to an unloading position having a crusher for handling the load received from the working machines.

A prerequisite for efficiently handling a quarrying plant is that the crusher is continuously provided with loads from the working machines, i.e. it should preferably at no times be left without load to handle. A problem often arising at, for example, the above described quarry plant is that the working machines have to stand in line before being able to unload their vehicle platform. The same naturally applies at the loading position where the working machines have to stand in line before being able to load their vehicle platform. Accordingly, the machine utilization at construction sites is in need of improvements such that the machines arrive at e.g. loading positions and/or unloading positions in such a way as to minimize their waiting time at the respective loading and unloading position.

SUMMARY

An object of the invention is to provide a method and system for determining a target vehicle speed for a first vehicle moving between a starting location and a target location at a worksite, which method and system determines a target vehicle speed based on the location and speed of a second vehicle.

According to a first aspect of the invention, there is provided a method comprising determining a target vehicle speed for a vehicle moving between a starting location and a target location at a worksite. In particular, the object is achieved by a method comprising: determining a first expected time-of arrival at the target location for a first vehicle; determining a second expected time-of arrival at the target location for a second vehicle, wherein the second expected time-of arrival is later than the first expected time-of arrival; determining a first time difference as the difference between the first expected time-of-arrival and the second expected time-of-arrival; estimating a fuel consumption for the first vehicle for reaching the target location at a current vehicle speed; estimating if the fuel consumption of the first vehicle for reaching the target location can be reduced by reducing the vehicle speed; and if the fuel consumption can be reduced, reducing the speed of the first vehicle to a target vehicle speed, wherein the target vehicle speed is higher than a threshold speed determined based on the first time difference.

By means of the described invention, fuel consumption for vehicles operating at a construction site can be improved. The target location may for example be a crusher at a quarrying plant where it is desirable that the idle time of the crusher is minimized, meaning that a vehicle should preferable arrive at the crusher just as a preceding vehicle leaves the crusher. By the described method, it is determined if a first vehicle approaching the target location can slow down, based on the expected time-of-arrival of a second vehicle arriving after the first vehicle. The fuel consumption of a working machine operating at a worksite depends on many different factors such as vehicle load, terrain, engine and transmission properties etc. Accordingly, it is not necessarily so that a reduction in speed lowers the fuel consumption. A lower vehicle speed may for example require a lower gear, in turn resulting in a higher engine speed which may increase the fuel consumption. Moreover, the estimated fuel consumption can be assumed to be the total fuel consumption for reaching the target location. Thereby, the vehicle speed is only reduced if the fuel consumption can be reduced and if the determined difference between the time-of-arrival of the first vehicle and the time-of-arrival of the second vehicle is sufficient.

According to one embodiment of the invention, the threshold speed of the first vehicle is a speed where the first time difference is equal to an expected occupation time at the target location for the first vehicle.

Thereby, it can be ensured that the speed of the first vehicle is not reduced to the extent that the second vehicle will have to wait at the target location.

According to one embodiment of the invention, the expected occupation time at the target location may be based on the time required for performing a loading or unloading operation at the target location.

Taking the example of the target location being a crusher at a quarry, the time required for the first vehicle to unload at the crusher can be estimated, and the speed of the first vehicle should thus not be reduced so that the second vehicle will have to wait at the crusher.

According to one embodiment of the invention, the estimated fuel consumption at a current vehicle speed may be assumed to be directly proportional to the vehicle speed.

Moreover, the estimated fuel consumption can be based on an assumption that the vehicle maintains a constant speed from the current location to the target destination. Thereby, a simplified method is provided which allows the method to be employed also in vehicles and vehicle management systems where the available information of e.g. fuel consumption and other vehicle properties is limited.

According to one embodiment of the invention, the threshold speed may be based on conditions of a road between the first vehicle and the target location.

The terrain may for example require that the vehicle does not travel below a certain speed for traversing obstacles or for climbing hills, meaning that the threshold speed can be set to take predetermined road conditions into account. Moreover, it is not required that the 35 vehicle follows a specific road, the vehicle may equally well travel over open terrain.

According to one embodiment of the invention, the method may further comprise determining an optimal speed of the first vehicle resulting in the lowest fuel consumption for reaching the target location, and if the optimal speed is lower than the current speed, reducing the speed of the first vehicle to the optimal speed.

Thereby, the method may involve first determining an optimal speed, not regarding the threshold speed. Once an optimal speed is determined it can be seen if the optimal speed is above or below the threshold speed, and if the optimal speed is higher than the threshold speed the vehicle can be controlled to travel at the optimal speed to optimize the fuel consumption. However, even if the threshold speed is not the optimal speed with respect to fuel consumption, it may still be desirable to set the target vehicle speed to the threshold speed under certain circumstances. The target location may for example be constricted, making it difficult for a plurality of vehicles to occupy the target location at any one time, thereby making it desirable to set the speed of the vehicles so that only one vehicle at the time occupies the target location.

According to one embodiment of the invention, the method may further comprise: for a third vehicle, determining a third expected time-of arrival at the target location, wherein the third expected time-of arrival is before the first expected time of arrival; determining a second time difference as the difference between the first expected time of arrival and the third expected time of arrival; and if the first time difference is larger than the second time difference for the current speed of the first vehicle, reducing the speed of the first vehicle to a target speed such that the first time difference is equal to the second time difference when the third vehicle reaches the target location.

The third vehicle is thus a vehicle anticipated to arrive at the target location before the arrival of the first vehicle, and by setting the target vehicle speed so that the second time difference is equal to the first time difference, meaning that the vehicle arrive at the target location with regular intervals. The intervals, i.e. the first and second time difference may advantageously be controlled to correspond to an occupation time at the target location so as to minimize the idle time of a resource at the target location.

According to one embodiment of the invention, the method may further comprise, for the third vehicle having an expected time of departure from the target location; determining the speed of the first vehicle such that the first time of arrival is later than the expected time of departure of the third vehicle.

Thereby, the first vehicle will not have to wait for its turn at the target location.

There is also provided a computer program comprising program code means for performing the steps of any one of the aforementioned embodiments when the program is run on a computer, and a computer readable medium carrying a computer program comprising program code means for performing the steps of the method according to any one of the aforementioned embodiments when the program product is run on a computer.

According to a second aspect of the invention there is provided a system for determining a target vehicle speed of a vehicle moving between a starting location and a target location at a worksite. The system comprises: a transmitter; a receiver; and a logic unit. The logic unit is configured to: determine a first expected time-of arrival at the target location for a first vehicle; determine a second expected time-of-arrival at the target location for a second vehicle, wherein the second expected time-of arrival is later than the first expected time-of arrival; determine a first time difference as the difference between the first expected time-of-arrival and the second expected time of arrival; estimate a fuel consumption for the first vehicle for reaching the target location at a current vehicle speed; estimate if the fuel consumption of the first vehicle for reaching the target location can be reduced by reducing the vehicle speed; and if the fuel consumption can be reduced, reduce the speed of the first vehicle to the a target vehicle speed, wherein the target vehicle speed is higher than a threshold speed. Furthermore, the transmitter, receiver, and logic unit form part of a machine-to-machine direct communication system in a vehicle.

Effects and features of this second aspect of the present invention are largely analogous to those described above in connection with the first aspect of the invention.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
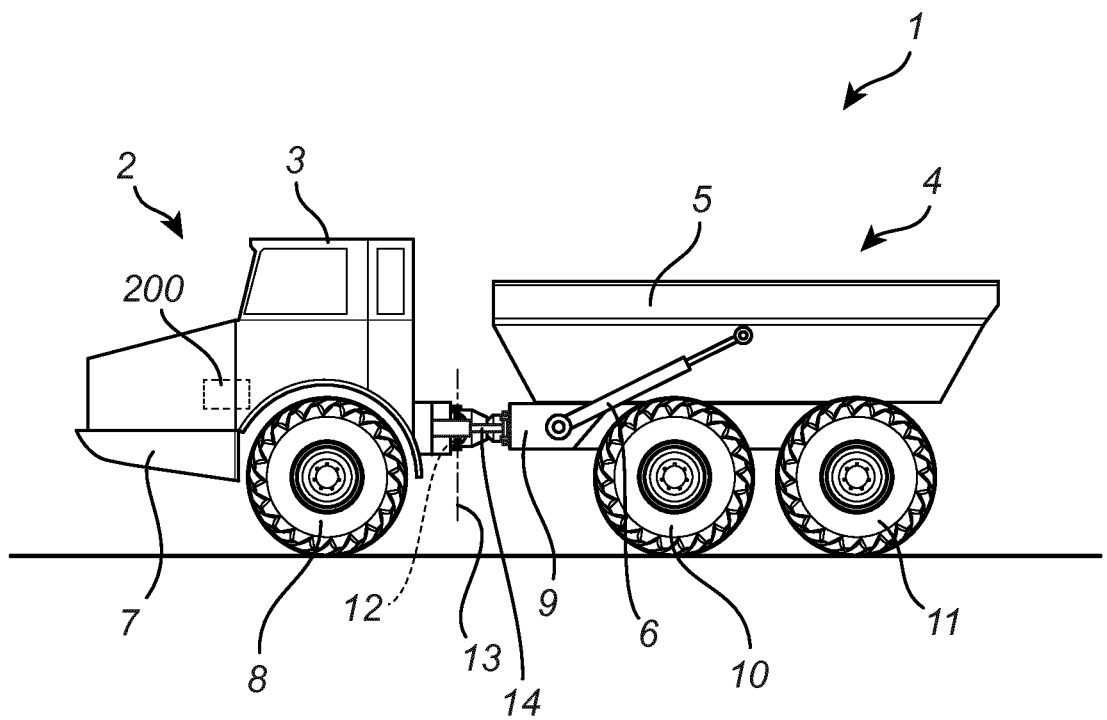
FIG. 1 is a schematic illustration of a working machine provided with a system according to an embodiment of the invention.

The present invention will now be described more fully hereinafter with reference to the accompanying drawings, in which exemplary embodiments of the invention are shown. The invention may, however, be embodied in many different forms and should not be construed as limited to the embodiment set forth herein; rather, these embodiments are provided for thoroughness and completeness. Like reference character refer to like elements throughout the description.

In the present detailed description, various embodiments of the method and system according to the present invention are mainly discussed with reference to articulated haulers carrying a load from a loading location to an unloading location at a working site. It should be noted that this by no means limits the scope of the present invention which is equally applicable to a wide range of different vehicles destined for a target location with limited access to a desired resource.

FIG. 1 is a perspective view of a working machine 1 in the form of an articulated hauler having a front section 2 with a cab 3 for a driver and a rear section 4 with a platform having a container 5 arranged thereon, for receiving load. The container is preferably pivotally connected to the rear section and tiltable by means of a pair of tilting cylinders 6, for example hydraulic cylinders. The front section has a front frame 7 and a pair of wheels 8 suspended from the front frame 7. The rear section 4 has a rear frame 9 and two pair of wheels 10, 11 suspended from the rear frame 9.

The working machine is frame-steered, i.e. there is a pivot joint 12 connecting the front section 2 and the rear section 4 of the working machine 1. The front section and the rear section are pivotally connected to each other for pivoting around a substantially vertical pivot axis 13. The working machine 1 preferably comprises a hydraulic system having two hydraulic cylinders 14, steering cylinders, arranged on opposite sides of the working machine for turning the working machine by means of relative movement of the front section 2 and the rear section 4. The hydraulic cylinders can, however, be replaced by any other linear actuator for steering the machine, such as an electromechanical linear actuator. The working machine 1 can further comprise a second pivot joint connecting the front section and the rear section of the working machine for allowing the front section and the rear section to pivot relative to each other about a substantially horizontal pivot axis extending in the longitudinal direction of the working machine 1.

Furthermore, the working machine 1 in the illustrated embodiment of FIG. 1 is provided with a system 200 for calculating a desired time of arrival at a target destination for the working machine 1. The system 200 is described in further detail with reference to FIG. 2. The system will firstly be described by means of its components and functionalities in relation to FIG. 2, and thereafter, with reference to FIGS. 3-5, be described in relation to exemplifying driving scenarios at a working site at which the working machine 1 is located.

Figure 2:
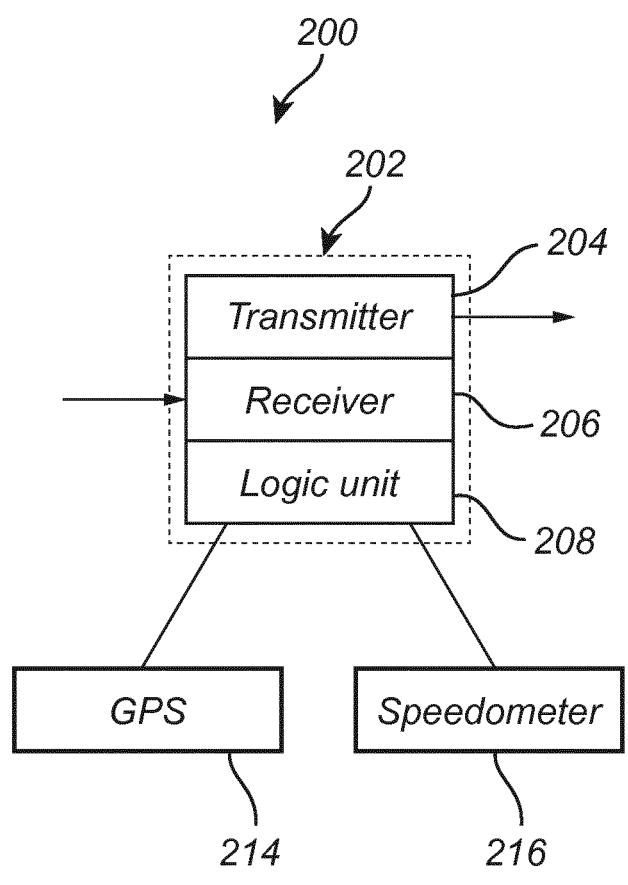
FIG. 2 is a block chart outlining general features of a system according to an embodiment of the invention, FIG. 3 schematically illustrates working machines performing a method according to an embodiment of the invention.

FIG. 2 shows an example embodiment of a system according to the present invention. The system comprises a device 202 which is arranged to be mounted on the vehicle 1 depicted in FIG. 1. The device 202 illustrated in the example embodiment of FIG. 2 comprises a transmitter 204, a receiver 206, and a logic unit 208. The logic unit 208 is configured to receive signals for determining the position of the vehicle 1 and its vehicle speed. This can be achieved by means of e.g. a global positioning unit (GPS) 214 and a speedometer 216. The GPS 214 and the speedometer 216 are in the example embodiment of FIG. 2 coupled to the logic unit 208. The GPS 214 and the speedometer 216 may of course also form an integral part of the logic unit 208.

The logic unit 208 may include a microprocessor, microcontroller, programmable digital signal processor or another programmable device. The logic unit 208 may also, or instead, include an application specific integrated circuit, a programmable gate array or programmable array logic, a programmable logic device, or a digital signal processor. Where the logic unit 208 includes a programmable device such as the microprocessor, microcontroller or programmable digital signal processor mentioned above, the processor may further include computer executable code that controls operation of the programmable device.

Figure 3:
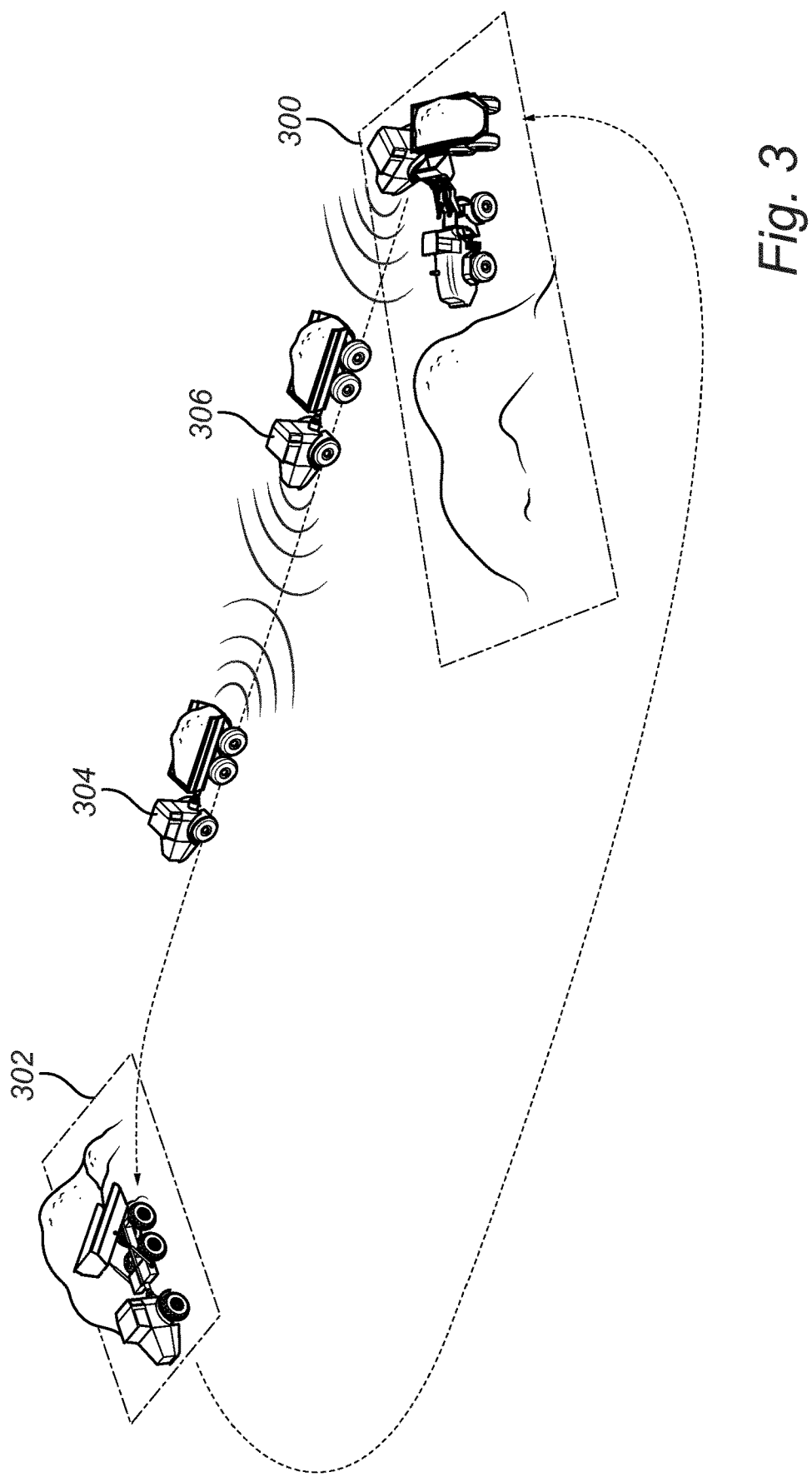
Figure 4:
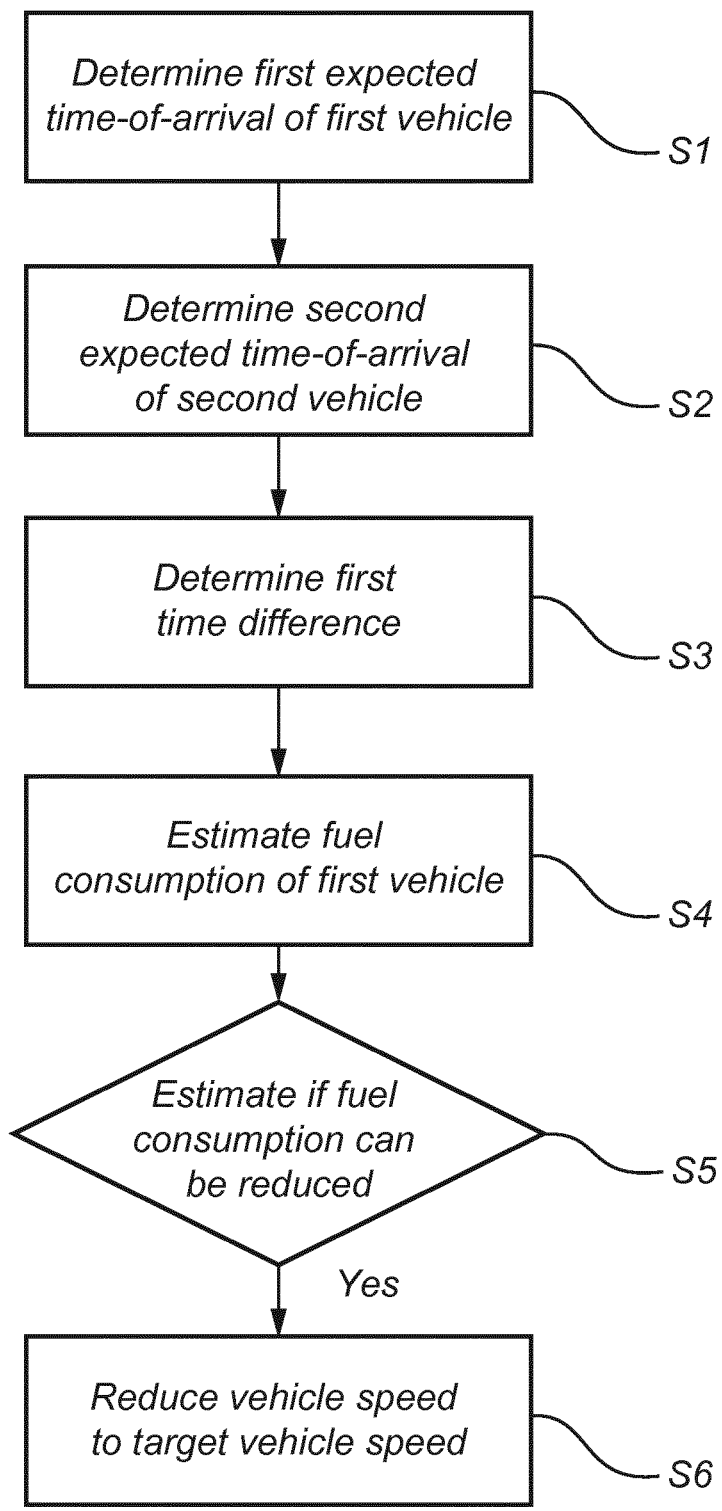
FIG. 4 is a flow chart outlining the general steps of a method according to an embodiment of the invention, FIG. 5 schematically illustrates working machines performing a method according to an embodiment of the invention.

The logic unit 208 is configured to perform a method according to an embodiment of the invention, where FIG. 3 schematically illustrates working machines at a worksite and FIG. 4 is a flow chart outlining the general steps of the method for determining a target vehicle speed for a vehicle moving between a starting location 300 and a target location 302 at a worksite. The first step comprises determining S1 a first expected time-of arrival at the target location 302 for a first vehicle 304. The expected time-of arrival can be determined based on knowledge of the vehicle location along with map data describing a route to the target location 302. The estimated time to reach the target location 302 may be further refined based on historical data for vehicle travelling the same route. Moreover, it also possible to take current road or terrain conditions into account, as well as traffic or any other obstacles or factors influencing the vehicle on the route to the target location 302. In short, any parameter known by the logic unit 208 to influence the vehicle can be taken into account when the expected time-of arrival is determined.

The next step comprises determining S2 a second expected time-of arrival at the target location for a second vehicle 306, wherein the second expected time-of arrival is later than the first expected time-of arrival. If the first and second vehicles 304, 306 are travelling along the same route, the second vehicle 306 is thus behind the first vehicle, hence having an estimated time-of-arrival which is later than the first time-of-arrival. However, the method is equally well applicable for vehicles travelling on different routes or for vehicles travelling over open terrain, as long as a time-of-arrival can be estimated. The time-of-arrival for each specific vehicle will then be determined based an expected route to the target location 302. For vehicles following a predetermined route from the starting location 300 to the target location 302 and travelling in a predictable manner such as in a controlled haul cycle, it may be sufficient to know the locations of the first and second vehicles 304, 306 to determine the first and second time-of-arrival with sufficient accuracy.

The second time-of-arrival for the second vehicle 306 may be determined in the second vehicle and communicated to the first vehicle 304, for example upon request or as a broadcast at predetermined intervals. In that case a transmitter 204 of the second vehicle 306 transmits a signal comprising information indicative of the second expected time-of-arrival which is received by the receiver 206 in the first vehicle. Accordingly, each of the first and second vehicle 304, 306 comprises a device as illustrated by FIG. 2 and discussed above. Thereby, the transmitter 204, receiver 206, and logic unit 208 of the device 202 form part of a machine-to-machine direct communication system in a vehicle.

It is also possible that each vehicle communicates via a relay, a central communication hub or the like. The vehicles may also communicate only with a remote server, for example in a cloud solution, where a central unit maintains updated information of the status and location of vehicles at the worksite.

In the following, a first time difference is determined S3 as the difference between the first expected time-of-arrival and the second expected time-of-arrival, and the total fuel consumption for the first vehicle 304 for reaching the target location 302 at a current vehicle speed is estimated S4. As discussed earlier, the estimation of the fuel consumption may take a wide range of factors into account. To simplify the description of the method, the fuel consumption can be assumed to be directly proportional to, i.e. to have a linear relation with, the vehicle speed. This assumption may hold true under certain circumstances and can at least provide a first approximation of a suitable target vehicle speed.

Once the fuel consumption for reaching the target destination 302 is estimated, it can be estimated S5 if the fuel consumption of the first vehicle 304 for reaching the target location can be reduced by reducing the speed of the first vehicle 304. Also here, the assumption that fuel consumption is linearly related to vehicle speed can be applied. If the fuel consumption can be reduced, the next step comprises reducing S6 the speed of the first vehicle 304 to a target vehicle speed, wherein the target vehicle speed is higher than a threshold speed determined based on the first time difference.

In addition to the first time difference, the threshold speed may also take vehicle limitations into account, such as maximum possible acceleration under the given conditions, maximum and/or minimum speed with a certain load etc.

The target vehicle speed may for example be presented to a driver of the vehicle in a display, head-up display (HUD), or any other type of graphical user interface (GUI) for the driver to control the vehicle to maintain the target speed. It is also possible that the target vehicle speed is provided to a control system of the vehicle for autonomous or semi-autonomous driving, i.e. similar to a cruise control or adaptive cruise control system, such that the vehicle automatically drives at the target speed.

Moreover, the described method steps may be performed repeatedly during the trip from the starting location 300 to the target location 302 so that the target speed can be updated during the trip if circumstances are changing. A target speed may for example be determined at regular intervals, or it may be determined if an event is detected which can be anticipated to change the first or second time-of-arrival. Information of such events can for example be received from other vehicles or from a central traffic control system.

Figure 5:
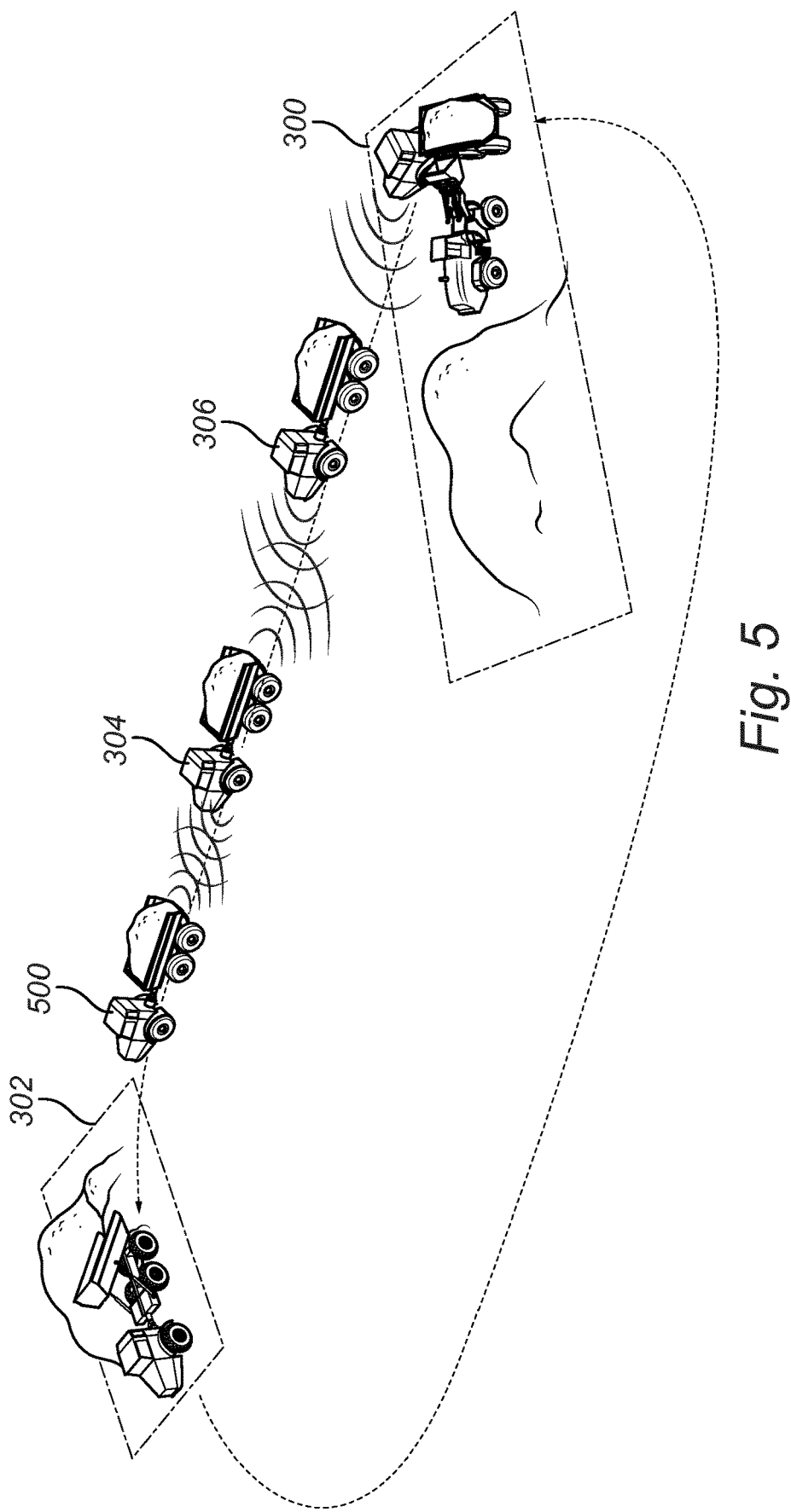
Figure 6:
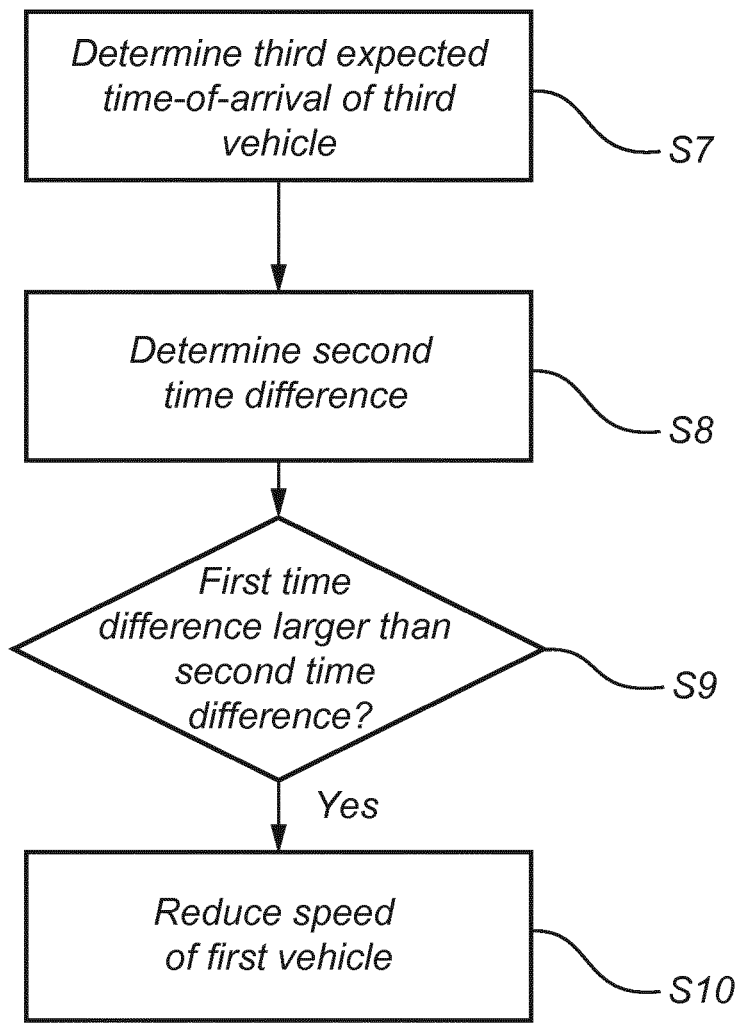
FIG. 6 is a flow chart outlining the general steps of a method according to an embodiment of the invention.

FIG. 5 schematically illustrates an example embodiment of the invention and FIG. 6 is a flow chart outlining the general steps of the method. The method further comprises, for a third vehicle 500, determining S7 a third expected time-of arrival at the target location 302, wherein the third expected time-of arrival is before the first expected time of arrival, determining S8 a second time difference as the difference between the first expected time of arrival and the third expected time of arrival; and if S9 the first time difference is larger than the second time difference for the current speed of the first vehicle, reducing S10 the speed of the first vehicle 304 to a target speed such that the first time difference is equal to the second time difference when the third vehicle 500 reaches the target location.

It is to be understood that the present invention is not limited to the embodiments described above and illustrated in the drawings; rather, the skilled person will recognize that many changes and modifications may be made within the scope of the appended claims.

The invention claimed is:

1. A method for controlling a vehicle moving between a starting location and a target location at a worksite, the method comprising:
   determining, by a processor circuit, a first expected time-of arrival at the target location for a first vehicle;
   determining, by the processor circuit, a second expected time-of arrival at the target location for a second vehicle, wherein the second expected time-of arrival is later than the first expected time-of arrival;
   determining, by the processor circuit, a first time difference as the difference between the first expected time-of-arrival and the second expected time-of-arrival, the first time difference being larger than an expected occupation time at the target location for the first vehicle;
   estimating, by the processor circuit, a fuel consumption for the first vehicle for reaching the target location at the first expected time-of arrival at a current vehicle speed;
   estimating, by the processor circuit, whether the fuel consumption of the first vehicle for reaching the target location can be reduced by reducing the vehicle speed while still arriving at the target location at a third expected time-of arrival, with a second time difference between the third expected time-of arrival and the second expected time-of arrival being larger than the expected occupation time at the target location for the first vehicle; and
   in response to an estimation that the fuel consumption can be reduced, automatically reducing the speed of the first vehicle to a target vehicle speed, wherein the target vehicle speed is higher than a threshold speed determined based on the expected occupation time at the target location for the first vehicle.

2. The method according to claim 1, wherein the expected occupation time at the target location is based on the time required for performing a loading or unloading operation at the target location.

3. The method according to claim 1, wherein estimating the fuel consumption at the current vehicle speed further comprises approximating the fuel consumption as being directly proportional to the vehicle speed.

4. The method according to claim 1, wherein the threshold speed is based on conditions of a road between the first vehicle and the target location.

5. The method according to claim 1, further comprising:
   determining an optimal speed of the first vehicle resulting in the lowest fuel consumption for reaching the target location, with a time difference between an expected time-of arrival of the first vehicle based on the optimal speed and the second expected time-of arrival being larger than the expected occupation time at the target location for the first vehicle;
   determining whether the optimal speed is lower than the current speed of the first vehicle; and
   in response to a determination that the optimal speed is lower than the current speed, reducing the speed of the first vehicle to the optimal speed.

6. The method according to claim 1, further comprising:
   for a third vehicle, determining a third expected time-of arrival at the target location, wherein the third expected time-of arrival is before the first expected time of arrival;
   determining a second time difference as the difference between the first expected time of arrival and the third expected time of arrival;
   determine whether the second time difference is larger than the first time difference; and
   in response to a determination that the first time difference is larger than the second time difference for the current speed of the first vehicle, reducing the speed of the first vehicle to a second target speed such that the difference between the first expected time-of-arrival and the second expected time-of-arrival is equal to the difference between the third expected time-of arrival and the first expected time-of arrival.

7. The method according to claim 6, further comprising:
determining an expected time of departure from the target location for the third vehicle; and
controlling the speed of the first vehicle such that the first time of arrival is later than the expected time of departure of the third vehicle.

8. A non-transitory computer readable medium carrying a computer program comprising program code for performing the method of claim 1 when the program product is run on a computer.

9. A system for controlling a vehicle moving between a starting location and a target location at a worksite, the system comprising:
a transmitter;
a receiver; and
a logic unit configured to:
determine a first expected time-of arrival at the target location for a first vehicle;
determine a second expected time-of-arrival at the target location for a second vehicle, wherein the second expected time-of arrival is later than the first expected time-of arrival, the first time difference being larger than an expected occupation time at the target location for the first vehicle;
determine a first time difference as the difference between the first expected time-of-arrival and the second expected time of arrival;
estimate a fuel consumption for the first vehicle for reaching the target location at the first expected time-of-arrival at a current vehicle speed;
estimate whether the fuel consumption of the first vehicle for reaching the target location can be reduced by reducing the vehicle speed while still arriving at the target location at a third expected time-of arrival, with a second time difference between the third expected time-of arrival and the second expected time-of arrival being larger than the expected occupation time at the target location for the first vehicle; and
in response to an estimation that the fuel consumption can be reduced, reduce the speed of the first vehicle to a target vehicle speed, wherein the target vehicle speed is higher than a threshold speed determined based on the expected occupation time at the target location for the first vehicle.

10. The system according to claim 9, wherein the transmitter, receiver, and logic unit form part of a machine-to-machine direct communication system in a vehicle.

11. The system according to claim 9, wherein the control unit is further configured to determine an optimal speed of the first vehicle resulting in the lowest fuel consumption for reaching the target location, with a time difference between an expected time-of arrival of the first vehicle based on the optimal speed and the second expected time-of arrival being larger than the expected occupation time at the target location for the first vehicle;

determining whether the optimal speed is lower than the current speed of the first vehicle; and
in response to a determination that the optimal speed is lower than the current speed, reducing the speed of the first vehicle to the optimal speed.

12. The system according to claim 9, wherein the control unit is further configured to:
for a third vehicle, determine a third expected time-of arrival at the target location, wherein the third expected time-of arrival is before the first expected time of arrival;
determine a second time difference as the difference between the first expected time of arrival and the third expected time of arrival;
determine whether the second time difference is larger than the first time difference; and
in response to a determination that the first time difference is larger than the second time difference for the current speed of the first vehicle, reduce the speed of the first vehicle such that the difference between the first expected time-of-arrival and the second expected time-of-arrival is equal to the difference between the third expected time-of arrival and the first expected time-of arrival.

13. A vehicle comprising a system according to claim 9.

14. A method for determining a target vehicle speed for a vehicle moving between a starting location and a target location at a worksite, the method comprising:
determining, by a processor circuit, a first expected time-of arrival at the target location for a first vehicle;
determining, by the processor circuit, a first expected time-of departure from the target location for the first vehicle based on an expected occupation time at the target location for the first vehicle;
determining, by the processor circuit, a second expected time-of arrival at the target location for a second vehicle, wherein the second expected time-of arrival is later than the first expected time-of departure;
estimating, by the processor circuit, a first fuel consumption for the first vehicle for reaching the target location at the first expected time-of-arrival at a current vehicle speed;
estimating, by the processor circuit, a second fuel consumption for the first vehicle for reaching the target location at a target vehicle speed lower than the current vehicle speed to arrive at the target location at a third expected time-of arrival, wherein a difference between the third expected time-of arrival of the first vehicle and the second expected time-of arrival for the second vehicle is greater than the expected occupation time at the target location for the first vehicle;
determine, by the processor circuit, whether the second fuel consumption is less than the first fuel consumption; and
in response to an estimation that the second fuel consumption is less than the first fuel consumption, automatically reducing the speed of the first vehicle from the current vehicle speed to the target vehicle speed.

* * * * *